United States Patent
Nakashima et al.

(10) Patent No.: US 7,596,315 B2
(45) Date of Patent: Sep. 29, 2009

(54) WAVELENGTH DIVISION MULTIPLEXING OPTICAL TRANSMISSION SYSTEM AND TRANSMISSION WAVELENGTH CONTROL METHOD THEREFOR

(75) Inventors: Hisao Nakashima, Kawasaki (JP); Takeshi Hoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 614 days.

(21) Appl. No.: 10/914,313

(22) Filed: Aug. 10, 2004

(65) Prior Publication Data

US 2005/0213979 A1    Sep. 29, 2005

(30) Foreign Application Priority Data

Mar. 24, 2004    (JP)    ............... 2004-086918

(51) Int. Cl.
    *H04J 14/02*    (2006.01)
(52) U.S. Cl. ....................................... 398/34
(58) Field of Classification Search ................ 398/95, 398/196, 34, 69, 82
    See application file for complete search history.

(56) References Cited

U.S. PATENT DOCUMENTS

| | | | |
|---|---|---|---|
| 6,034,799 A * | 3/2000 | Hansen | 398/1 |
| 6,498,871 B1 * | 12/2002 | Kuboki | 385/24 |
| 6,931,034 B2 * | 8/2005 | Khazaei et al. | 372/9 |
| 6,937,795 B2 * | 8/2005 | Squires et al. | 385/37 |
| 6,961,356 B2 * | 11/2005 | Brown | 372/29.01 |
| 7,031,355 B2 * | 4/2006 | Khazaei et al. | 372/32 |
| 7,313,157 B2 * | 12/2007 | Sorin et al. | 372/50.1 |
| 2005/0129402 A1 * | 6/2005 | Kim et al. | 398/79 |
| 2007/0223925 A1 * | 9/2007 | Ohtani | 398/79 |

FOREIGN PATENT DOCUMENTS

| | | |
|---|---|---|
| JP | 8-51411 | 2/1996 |
| JP | 9-243507 | 9/1997 |
| JP | 10-262001 | 9/1998 |
| JP | 11-103287 | 4/1999 |
| WO | 99/17485 | 4/1999 |

OTHER PUBLICATIONS

Japanese Patent Office Action mailed Jun. 2, 2009 for corresponding Japanese Patent Application No. 2004-086918.

* cited by examiner

*Primary Examiner*—Leslie Pascal
(74) *Attorney, Agent, or Firm*—Staas & Halsey LLP

(57) ABSTRACT

In the wavelength division multiplexing optical transmission system according to the present invention, when setting the transmission wavelengths of the wavelength-variable optical transmitter in case of addition or expansion of the optical transmitter, each transmission wavelength is set automatically so as to match with each port wavelength of the input port in the multiplexer. Therefore, the setting workload of the optical transmitter is remarkably reduced, and occurrence of incorrect setting can be avoided. Also, with a simple and low-cost structure, the cost is restrained from increasing.

8 Claims, 11 Drawing Sheets

FIG. 7

| TRANSMISSION WAVELENGTH | PORT WAVELENGTH |
|---|---|
| λ1 | λ2 |
| λ2 | λ3 |
| ... | ... |
| λn−1 | λn |
| λn | λ1 |

… the optical transmission signal wavelength is controlled and set based on the correspondence relation between the optical transmission signal from the wavelength-variable optical transmitter and the return optical signal generated from the optical transmission signal passing through the multiplexer.

WAVELENGTH DIVISION MULTIPLEXING OPTICAL TRANSMISSION SYSTEM AND TRANSMISSION WAVELENGTH CONTROL METHOD THEREFOR

FIELD OF THE INVENTION

The present invention relates to a wavelength division multiplexing optical transmission system and a method for controlling the transmission wavelengths of a plurality of wavelength-variable optical transmitters used in the wavelength division multiplexing optical transmission system.

BACKGROUND OF THE INVENTION

The wavelength division multiplexing (WDM) optical transmission system transmitting signals by multiplexing different wavelengths on a single optical fiber has been put into practical use as long haul and large capacity communication medium.

FIG. 1 shows a diagram illustrating an overall configuration example of the wavelength division multiplexing optical transmission system. A transmission unit 10 is constituted of a plurality of optical transmitters 12-1, 12-2, ... 12-n. From each optical transmitter, light of different wavelengths is transmitted and input into a multiplexer unit 22 in a WDM unit 20 on the transmission side. Multiplexer unit 22 has a plurality of ports which receives a plurality of different wavelengths ($\lambda_1, \lambda_2, \ldots \lambda_n$). Optical signals input to each port are multiplexed in multiplexer unit 22. The multiplexed optical signals are then amplified by an optical amplifier 24 in WDM unit 20, and forwarded to a transmission line 30. The optical signals are amplified in optical relay units 32 disposed in the middle of transmission line 30, and reach a demultiplexer 42 of a WDM unit 40 on the receiving side. In demultiplexer 42, the optical signals are demultiplexed to each optical signal of different wavelength.

To introduce the wavelength division multiplexing optical transmission system, complicated wiring and a multiplicity of optical transmitters are necessary. Therefore, a vast amount of time and work are necessary for such setting and wiring at the time of installation and expansion.

Here, an exemplary installation procedure of a new channel according to the conventional method is described in the following.

(1) Inserting an optical transmitter into a vacant slot of a shelf for mounting a plurality of optical transmitters in the transmission unit.

(2) Connecting and setting a WDM unit (such as optical multiplexer and optical amplifier), and initiating the WDM unit.

(3) Connecting the optical transmitter to a designated port of the multiplexer in the WDM unit, while verifying using a wiring diagram, etc.

(4) Setting an optical transmitter wavelength to the wavelength of the connected port.

In particular, in the above work (4), when connecting a multiplicity of optical transmitters to the respective ports in the multiplexer of the WDM unit, it is necessary to set the transmission wavelength of each transmitter to the wavelength corresponding to the connected port. Conventionally, a worker sets this work manually by referring to the diagram.

However, this manual work of setting each transmission wavelength to the transmitter is time-consuming and may possibly induce incorrect setting. Once such an incorrect setting occurs, various problems may occur, such as delayed start of normal operation and extra operation cost.

As such, when installing or expanding the wavelength division multiplexing optical transmission system, and when setting a multiplicity of channels is required, it is necessary to install, or expand, a multiplicity of optical transmitters corresponding to the number of channels. This requires an increased load of workers on site, and therefore reduction of the work has been desired.

SUMMARY OF THE INVENTION

Accordingly, it is an object of the present invention to provide a wavelength multiplexing optical transmission system and a transmission wavelength control method therefor, thereby enabling easy setting of the transmission wavelengths in an optical transmitter in the wavelength multiplexing optical transmission system, and a reduced workload therefor.

In order to attain the aforementioned object, according to the present invention, a wavelength division multiplexing optical transmission system includes: a plurality of wavelength-variable optical transmitters having a wavelength-variable light source; a multiplexer multiplexing a plurality of optical transmission signals having different wavelengths respectively input from the plurality of wavelength-variable optical transmitters, and outputting the multiplexed optical transmission signal; and a return optical signal generator generating a return optical signal corresponding to each optical transmission signal output from the multiplexer, and transmitting the return optical signal toward the wavelength-variable optical transmitters via the multiplexer. The aforementioned wavelength-variable optical transmitter includes a first sensor sensing the return optical signal; and a controller controlling a transmission wavelength of the optical transmission signal output from the light source, based on the return optical signal detected in the first sensor corresponding to the optical transmission signal, when the transmission wavelength of the optical transmission signal output from the light source is set so as to match a port wavelength proper to each multiplexer input port receiving the optical transmission signal to enable wavelength multiplexing.

Namely, the optical transmission signal wavelength is controlled and set based on the correspondence relation between the optical transmission signal from the wavelength-variable optical transmitter and the return optical signal generated from the optical transmission signal passing through the multiplexer.

Preferably, when the first sensor does not detect the return optical signal corresponding to the optical transmission signal having a predetermined wavelength output from the light source, the controller controls to retransmit the optical transmission signal from the light source after changing the transmission wavelength of the optical transmission signal to another wavelength, while when the first sensor detects the return optical signal, the controller sets the transmission wavelength to the optical transmission signal wavelength corresponding to the detected return optical signal.

Further, preferably, in order to enable both the optical transmission signal of the predetermined wavelength output from the light source and the return optical signal corresponding to the optical transmission signal to be identified from respective optical transmission signals output from other wavelength-variable transmitters and return optical signals corresponding to the optical transmission signals, the controller controls to superpose predetermined information to the optical transmission signal having the predetermined wavelength output from the light source, and transmit the optical transmission signal, and in case the first sensor detects the return optical signal, the controller compares the information superposed onto the return optical signal with the information transmitted in the optical transmission signal, and when both the information sets are inconsistent, the controller controls to retransmit the optical transmission signal from the light source with predetermined information being superposed after changing the transmission wavelength of the optical transmission signal to another wavelength, while when both the superposed information sets are consistent, the controller sets the transmission wavelength to the optical transmission signal wavelength corresponding to the detected return optical signal.

Further, in case that the optical transmission signal is intensity-modulated with a predetermined frequency, the aforementioned information is the frequency concerned.

Also, as a transmission wavelength control method according to the present invention to achieve the above-mentioned object, in a wavelength division multiplexing optical transmission system including a plurality of wavelength-variable optical transmitters generating wavelength-variable optical transmission signals; and a multiplexer multiplexing a plurality of optical transmission signals having different wavelengths respectively input from the plurality of wavelength-variable optical transmitters, and outputting the multiplexed optical transmission signal, the transmission wavelength control method of an optical transmission signal to be transmitted from the above-mentioned wavelength-variable transmitter includes: a first step generating a return optical signal corresponding to each optical transmission signal output from the multiplexer, and transmitting the return optical signal toward the wavelength-variable optical transmitters via the multiplexer; and a second step controlling the transmission wavelength of the optical transmission signal based on the return optical signal detected in the wavelength-variable optical transmitter, when the transmission wavelength of the optical transmission signal output from the light source is set so as to match a port wavelength proper to each multiplexer input port receiving the optical transmission signal, to enable wavelength multiplexing.

In the wavelength division multiplexing optical transmission system according to the present invention, when setting the transmission wavelengths of the wavelength-variable optical transmitter in case of addition or expansion of the optical transmitter, each transmission wavelength is set automatically so as to match with each port wavelength of the input port in the multiplexer. Therefore, the setting workload of the optical transmitter is remarkably reduced, and occurrence of incorrect setting can be avoided. Also, with a simple and low-cost structure, the cost is restrained from increasing.

Further scopes and features of the present invention will become more apparent by the following description of the embodiments with the accompanied drawings.

BRIEF DESCRIPTION OF THE DRAWINGS

FIG. 7 shows a diagram illustrating a table indicative of correspondence relations between output wavelengths and port wavelengths.

DETAILED DESCRIPTION OF THE PREFERRED EMBODIMENTS

The preferred embodiment of the present invention is described hereinafter referring to the charts and drawings. However, it is noted that the scope of the present invention is not limited to the embodiments described below, but instead embraces all equivalents to the claims described.

Figure 1:
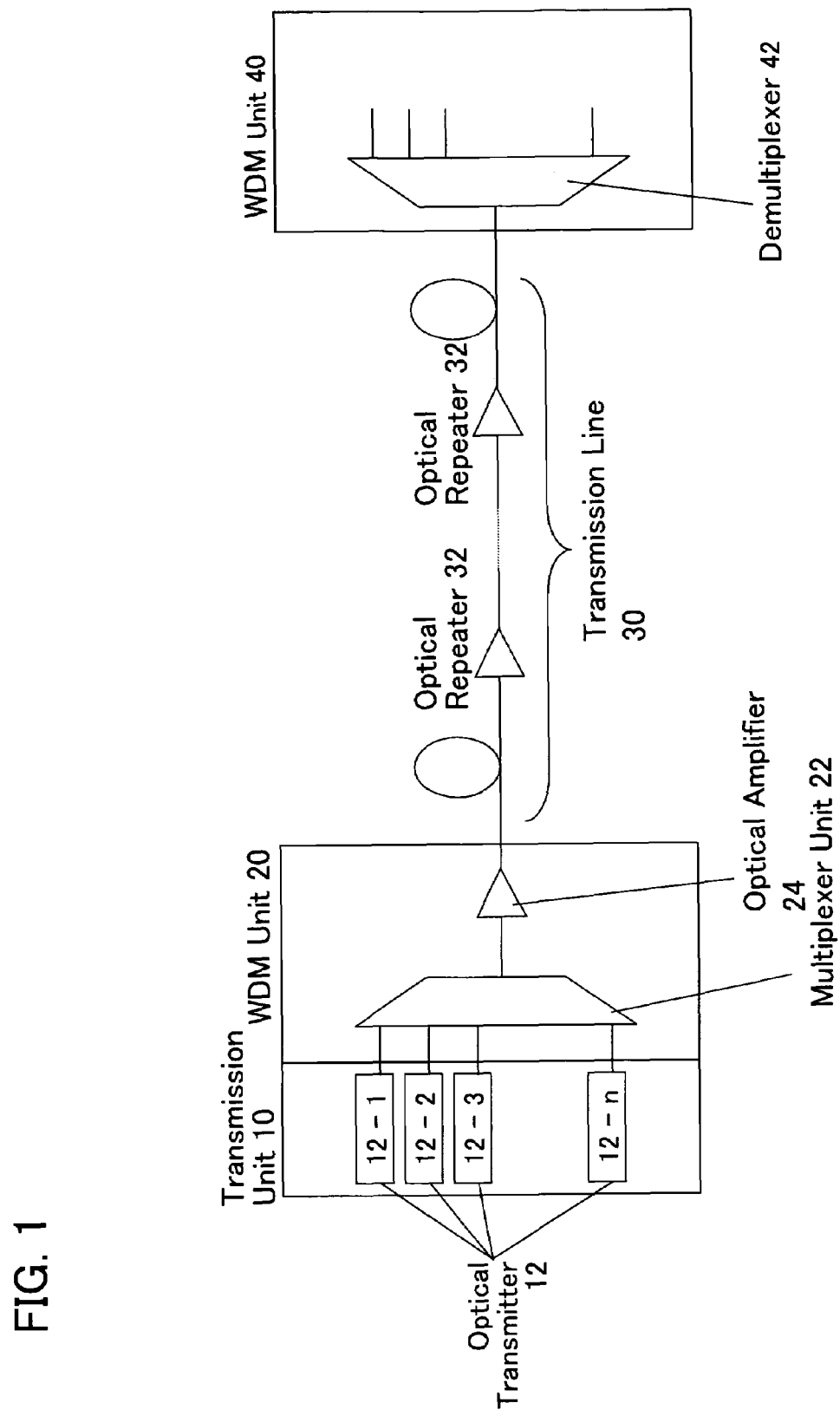
FIG. 1 shows an overall configuration example of a wavelength division multiplexing optical transmission system.
Figure 2:
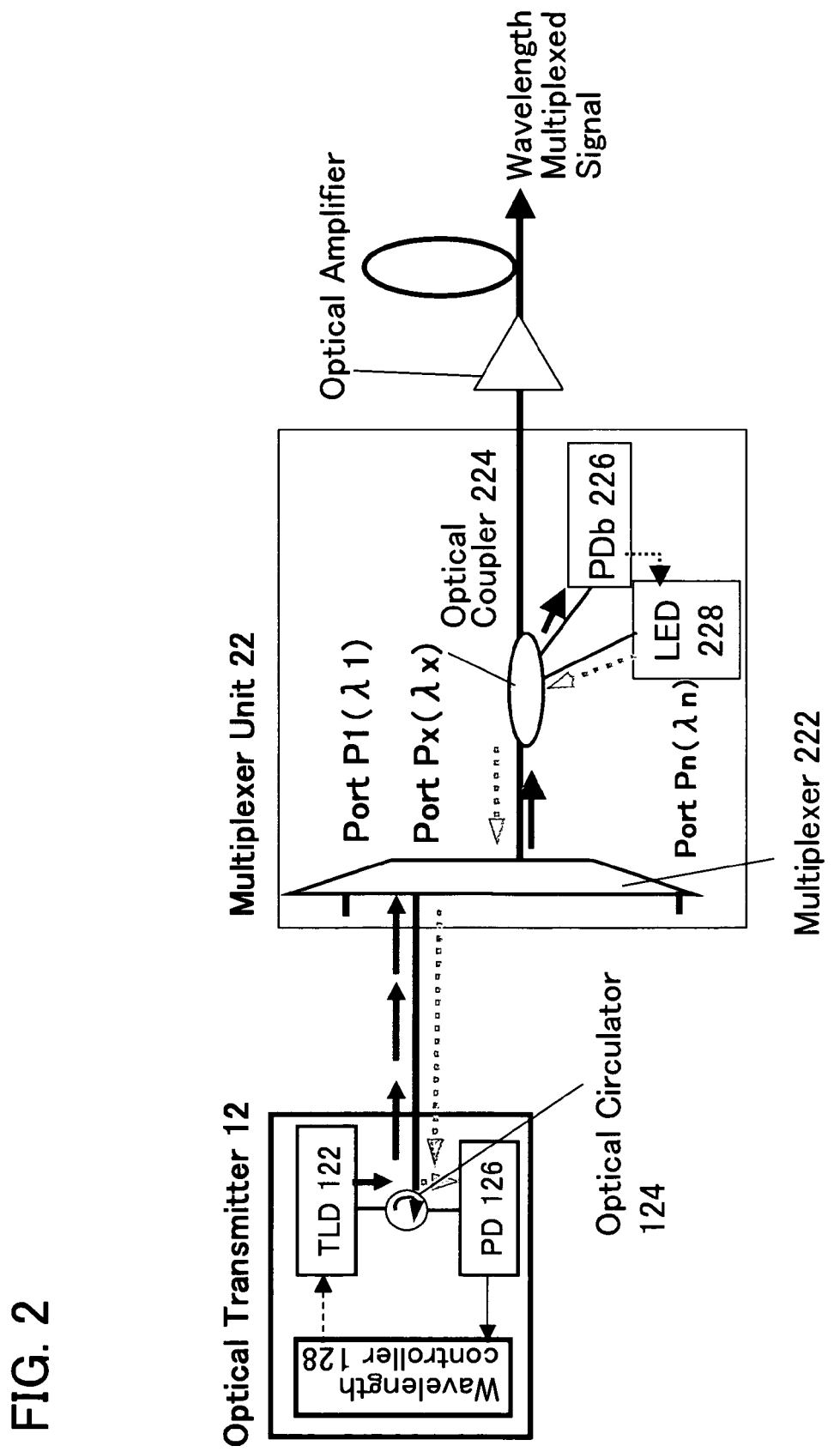
FIG. 2 shows a first exemplary configuration of a wavelength division multiplexing optical transmission system according to an embodiment of the present invention.

FIG. 2 shows a first exemplary configuration of a wavelength division multiplexing optical transmission system according to an embodiment of the present invention. In this FIG. 2, configurations of an optical transmitter 12 provided in a transmission unit and a multiplexer unit 22 provided in a WDM unit, respectively equipped on the transmission side of a wavelength division multiplexing optical transmission system according to the embodiment of the present invention. Optical transmitter 12 includes wavelength-variable (tunable) laser diode (TLD) 122, optical circulator 124, photodiode (PD) 126, and wavelength controller 128. Also, multiplexer unit 22 includes multiplexer 222, optical coupler 224, photodiode (PDb) 226 and light emitting diode (LED) 228.

The operation of the first exemplary configuration is explained in the following. An optical signal wavelength output from TLD 122 can be changed according to a control signal given from wavelength controller 128, and the output optical signal is input into a port Px of multiplexer 222, to which optical transmitter 12 is connected, via optical circulator 124. The port Px is a port which transmits an optical signal of wavelength λx. Therefore, when the wavelength of an optical signal from TLD 122 is λx, an optical signal having the wavelength λx is output from multiplexer 222. The optical signal of wavelength λx then reaches photodiode (PDb) 226 via optical coupler 224 of multiplexer unit 22. On receipt of the optical signal of wavelength λx, photodiode (PDb) 226 outputs a detection signal (electric current) corresponding the optical signal level (and a frequency in case that a predetermined frequency is superposed onto the optical signal, as described later). The detection signal is then supplied to light emitting diode (LED) 228. LED 228 has a light emission spectrum which covers the entire wavelengths received by the respective ports of multiplexer 222, and emits the light corresponding to each detected signal level. The light emitted from LED 228 produces return light proceeding, through optical coupler 224, in the reverse direction to the traveling direction of the light output from TLD 122. This return light enters the output portion of multiplexer 222. Then, the return light is made-to branch into each wavelength, and is output from each port including the port Px. From the port Px, the light having wavelength λx is input into optical transmitter 12. Through optical circulator 124 of optical transmitter 12, the return light of wavelength λx from the port Px is received by photodiode (PD) 126, and the detection signal of the return light is supplied to wavelength controller 128. Here, in FIG. 2, optical circulator 124 is used to make the return light branch. However, it may also be possible to use an optical coupler, in place of optical circulator 124, when an isolator is incorporated in TLD 122.

Namely, when the optical signal wavelength output from TLD 122 matches the wavelength (port wavelength) passing through the port P of multiplexer 222 to which optical transmitter 12 is connected, photodiode (PD) 126 in the optical transmitter receives the return light. Based on the output signal from photodiode (PD) 126, wavelength controller 128 can recognize that the optical signal wavelength from TLD 122 matches the port wavelength of the port P of multiplexer 222

On the other hand, when the optical signal wavelength output from TLD 122 does not match the port wavelength of the port P of multiplexer 222 connected therein, since the optical signal cannot pass through the port P, the optical signal does not reach photodiode (PDb) 226 in multiplexer unit 22. Also, since there is no return light output from light emitting diode (LED) 228, photodiode (PD) 126 in optical transmitter 12 does not receive any return light, and also wavelength controller 128 does not receive any signal from photodiode (PD) 126. In this case, wavelength controller 128 can recognize that the optical signal wavelength output from TLD 122 does not match the port wavelength of the port P of multiplexer 222.

Figure 3:
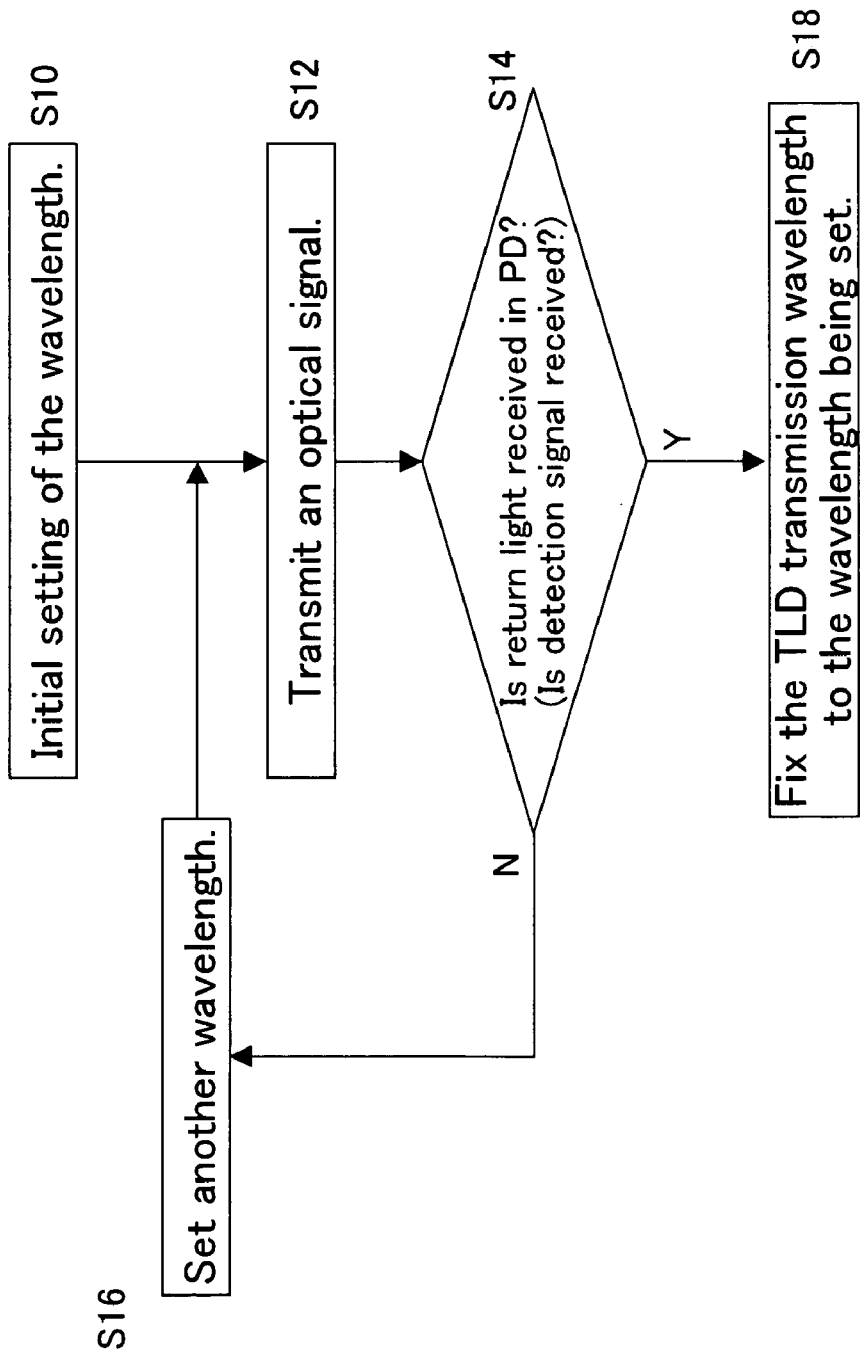
FIG. 3 shows a flowchart illustrating the operation of a wavelength controller 128 in the first exemplary configuration.

FIG. 3 shows a flowchart illustrating the operation of wavelength controller 128 in the first exemplary configuration. Wavelength controller 128 sets the wavelength in TLD 122 to an arbitrary initial value (step S10), and transmits an optical signal having the wavelength set above (S12). Then, in the step S14, when no detection signal from photodiode (PD) 126 based on the return light corresponding to the optical signal having the wavelength of interest is received, wavelength controller 128 sets the wavelength of TLD 122 to another wavelength (S16), and transmits an optical signal having the other wavelength set above (S12). Wavelength controller 128 repeats the above-mentioned operation until a detection signal is received from photodiode (PD) 126. On receipt of an output signal from photodiode (PD) 126, wavelength controller 128 fixes the transmission wavelength of TLD 122 to the wavelength having been set above, without modification (S18).

In such a way, according to the embodiment of the present invention, the optical signal wavelength to be transmitted from optical transmitter 12 can automatically be matched the port wavelength of the port P of multiplexer unit 22. Thus, the setting work of a transmission wavelength into the optical transmitter becomes quite easy.

Figure 4:
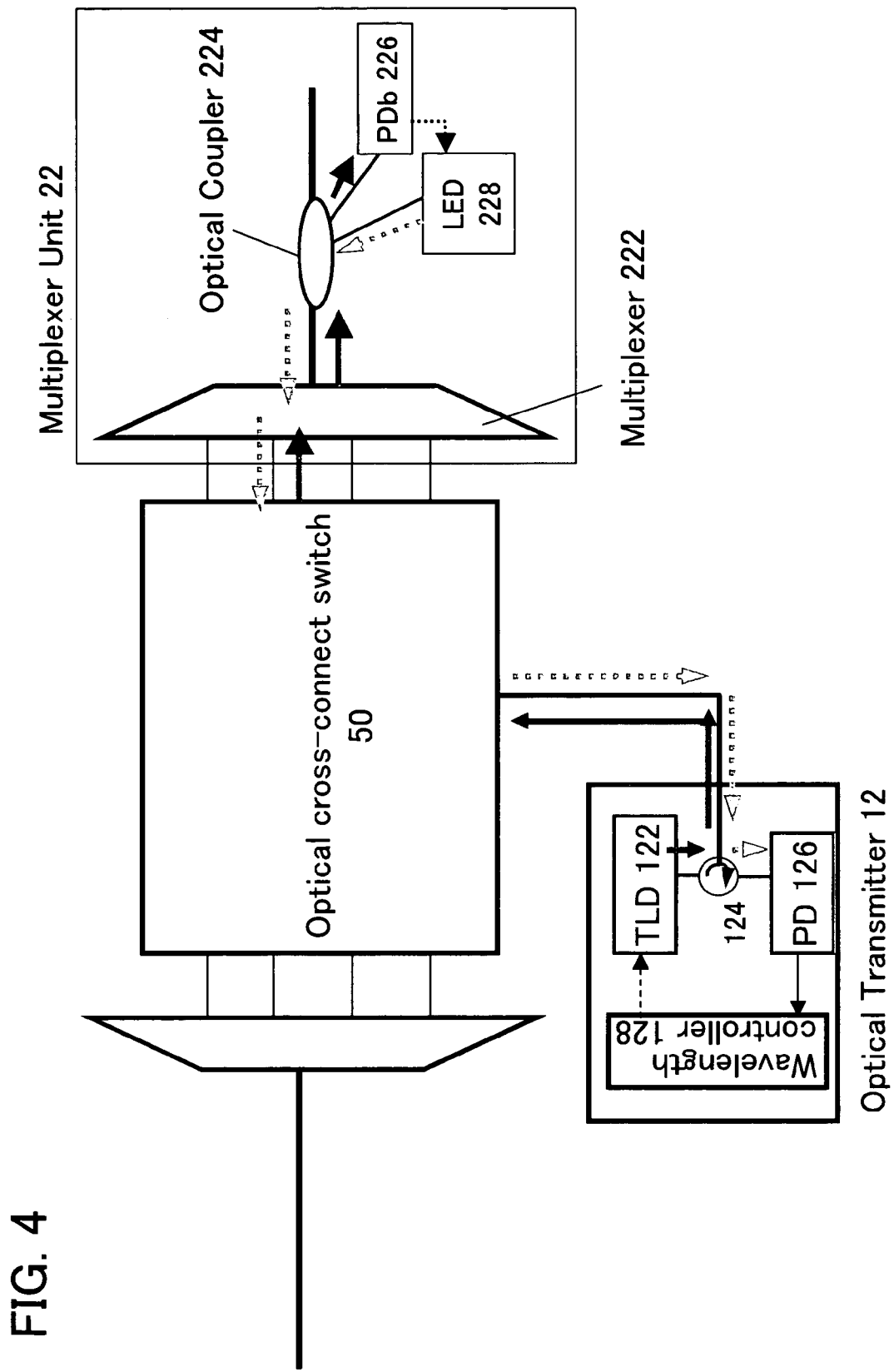
FIG. 4 shows a diagram illustrating a modification example of the first exemplary configuration.

FIG. 4 shows a diagram illustrating a modification example of the first exemplary configuration, in which optical transmitter 12 is connected to a multiplexer port via an optical cross-connect switch 50. Optical cross-connect switch 50 enables arbitrarily switching connections between a multiple of inputs and outputs. Even when optical cross-connect switch 50 is disposed between optical transmitter 12 and multiplexer unit 22 as shown in FIG. 4, the operation of each configuration element is quite the same as the operation in the first exemplary configuration, except for the optical signal being passed through the wiring of optical cross-connect switch 50 in this case.

Figure 5:
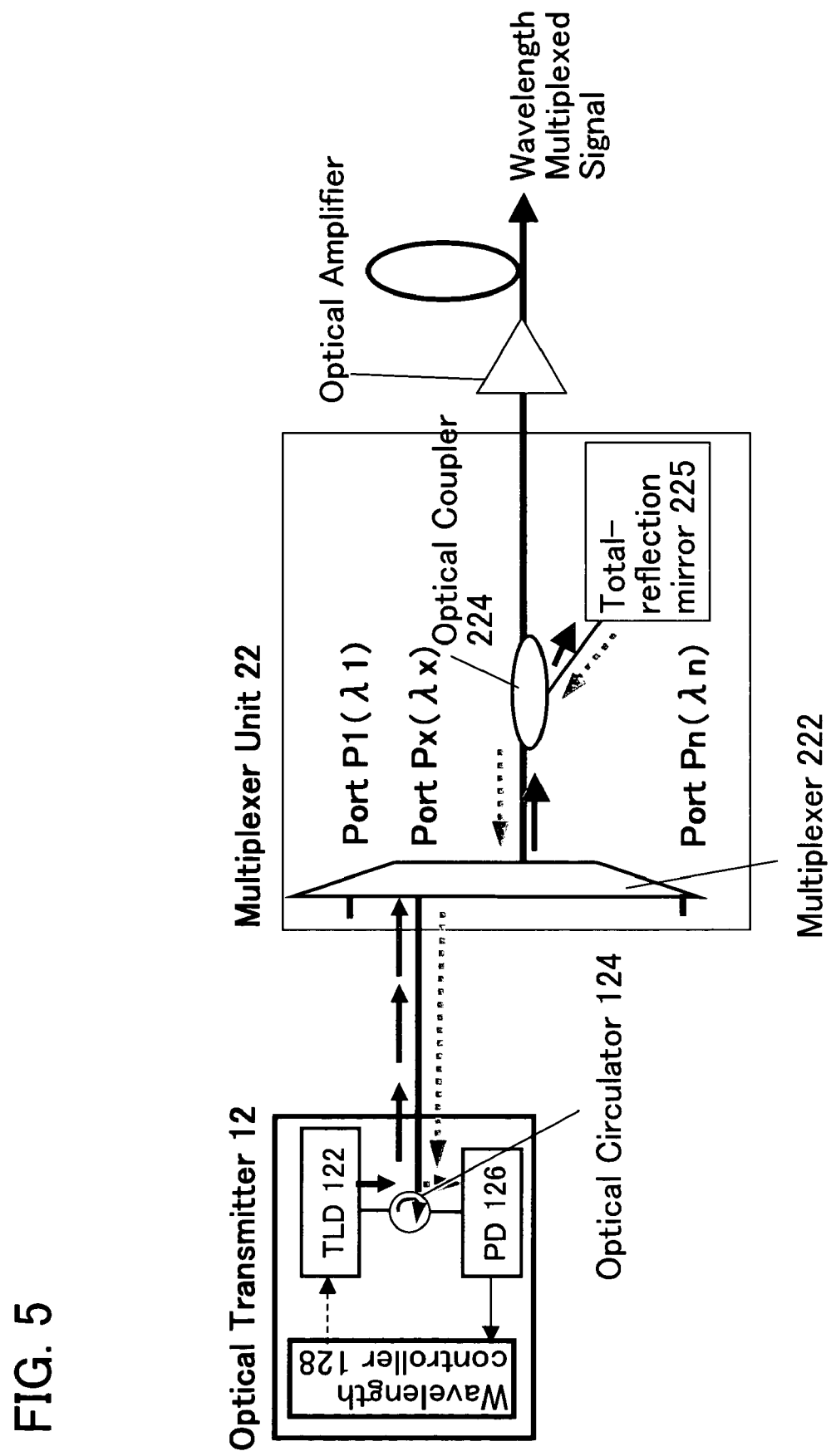
FIG. 5 shows a second exemplary configuration of a wavelength division multiplexing optical transmission system according to an embodiment of the present invention.

FIG. 5 shows a second exemplary configuration of the wavelength division multiplexing optical transmission system according to an embodiment of the present invention. In this second exemplary configuration, a total-reflection mirror 223 is used, in place of photodiode (PDb) 226 and light emitting diode (LED) 228 in multiplexer unit 22 of the aforementioned first exemplary configuration. Namely, the light from TLD 122 through multiplexer 222 is reflected by total-reflection mirror 223, by which the return light is generated. This return light is received by photodiode (PD) 126 in optical transmitter 12, which enables determination whether the transmission wavelength matches the port wavelength. The operation of wavelength controller 128 in this case is the same as that shown in the flowchart of FIG. 3.

Figure 6:
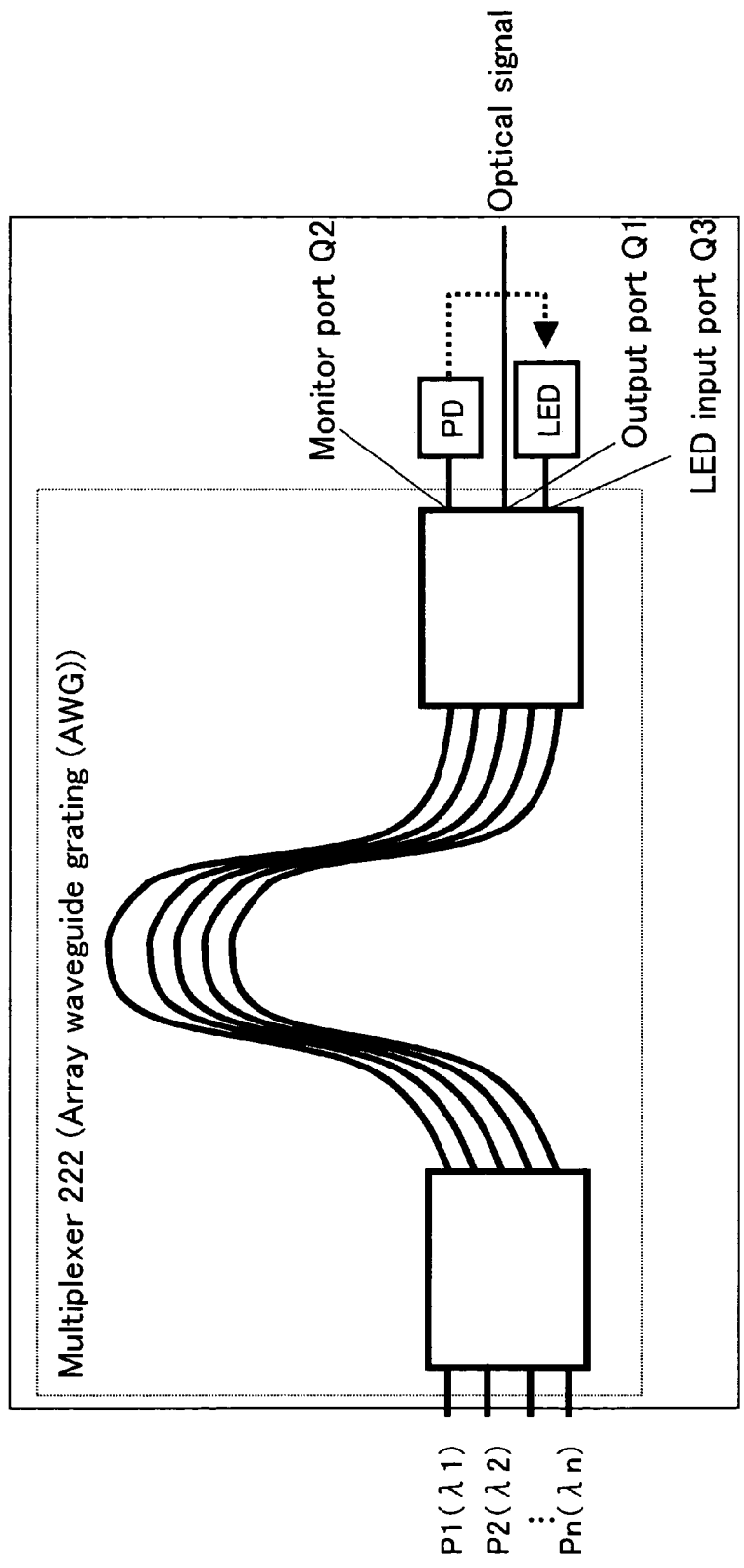
FIG. 6 shows a third exemplary configuration of a wavelength division multiplexing optical transmission system according to an embodiment of the present invention.

FIG. 6 shows a third exemplary configuration of the wavelength division multiplexing optical transmission system according to an embodiment of the present invention. In FIG. 6, an array waveguide grating (AWG) is employed as multiplexer 222 of multiplexer unit 22, and only multiplexer unit 22 is shown, while optical transmitter 12 is omitted in this figure. The structure of optical transmitter 12 is similar to that shown in the above first and second exemplary configuration.

On the input side of the array waveguide grating (AWG) a plurality of ports (P1, P2, ... Pn) are provided corresponding to different wavelengths (λ1, λ2, ... λn). On the output side, in addition to an output port Q1 from which a multiplexed optical signal is output, a monitor port Q2 and an LED input port Q3 are provided. Here, in the case an optical signal having a different wavelength from the corresponding port wavelength is input to a certain port, the optical signal having the above different wavelength is output to the monitor port Q2. To the LED input port Q3, the light output from the light emitting diode (LED) is input. A photodiode (PD) is attached to the monitor port Q2. When the optical signal is output from the monitor port Q2, the photodiode (PD) receives the optical signal. Caused by the current being output corresponding to the optical signal level, the light emitting diode (LED) emits light. Return light from the light emitting diode (LED) is input to the LED input port Q3, and output from each port P on the input side of the array waveguide grating (AWG).

For example, assuming that the port wavelength of the port P1 on the input side is λ1, in case an optical signal of wavelength λ1 is input into the port P1, the optical signal of wavelength λ1 is output from the output port Q1. Meanwhile, in case an optical signal of wavelength λ2 is input into the port P1, the optical signal of wavelength λ2 is output from the monitor port Q2.

Under the above circumstance, in case the optical signal of wavelength λ2 is input into the port P1 of which port wavelength is λ1, photodiode (PD) 126 in optical transmitter 12 receives the return light. Wavelength controller 128 is provided in advance with a table indicative of correspondence relations between the transmission wavelengths from TLD 122 and the port wavelengths. By referring to this table, wavelength controller 128 recognizes the port wavelength based on the return light received by the photodiode (PD).

Here, in this third exemplary configuration using the array waveguide grating, when the total-reflection mirror is used to generate return light, as shown in the third exemplary configuration of FIG. 5, the LED input port Q3 is not necessary. A return optical signal generated by reflecting a transmitted optical signal is input from the monitor port Q2.

FIG. 7 shows an example of the table indicative of correspondence relations. According to the relation shown in FIG. 7, in case of the example shown above, since photodiode (PD) 126 receives return light when an optical signal of wavelength λ2 is input to the port P1, wavelength controller 128 recognizes the port wavelength of the port P1 as λ1, and accordingly wavelength controller 128 changes the output wavelength of TLD 122 from wavelength λ2 to wavelength λ1, and fixes the output wavelength as such.

As shown in FIG. 7, in case that an optical signal of wavelength λ3 is input to the port P2 of port wavelength λ2, an optical signal of wavelength λ4 is input to the port P3 of port wavelength λ3, or an optical signal of wavelength λ1 is input to the port P4 of port wavelength λ4, the array waveguide grating (AWG) is structured so as to output each optical signal being input to each port to the monitor port Q2. Therefore, in the same way as described above, wavelength controller 128 recognizes the port wavelength of each port, and sets each transmission wavelength of TLD 122.

Figure 8:
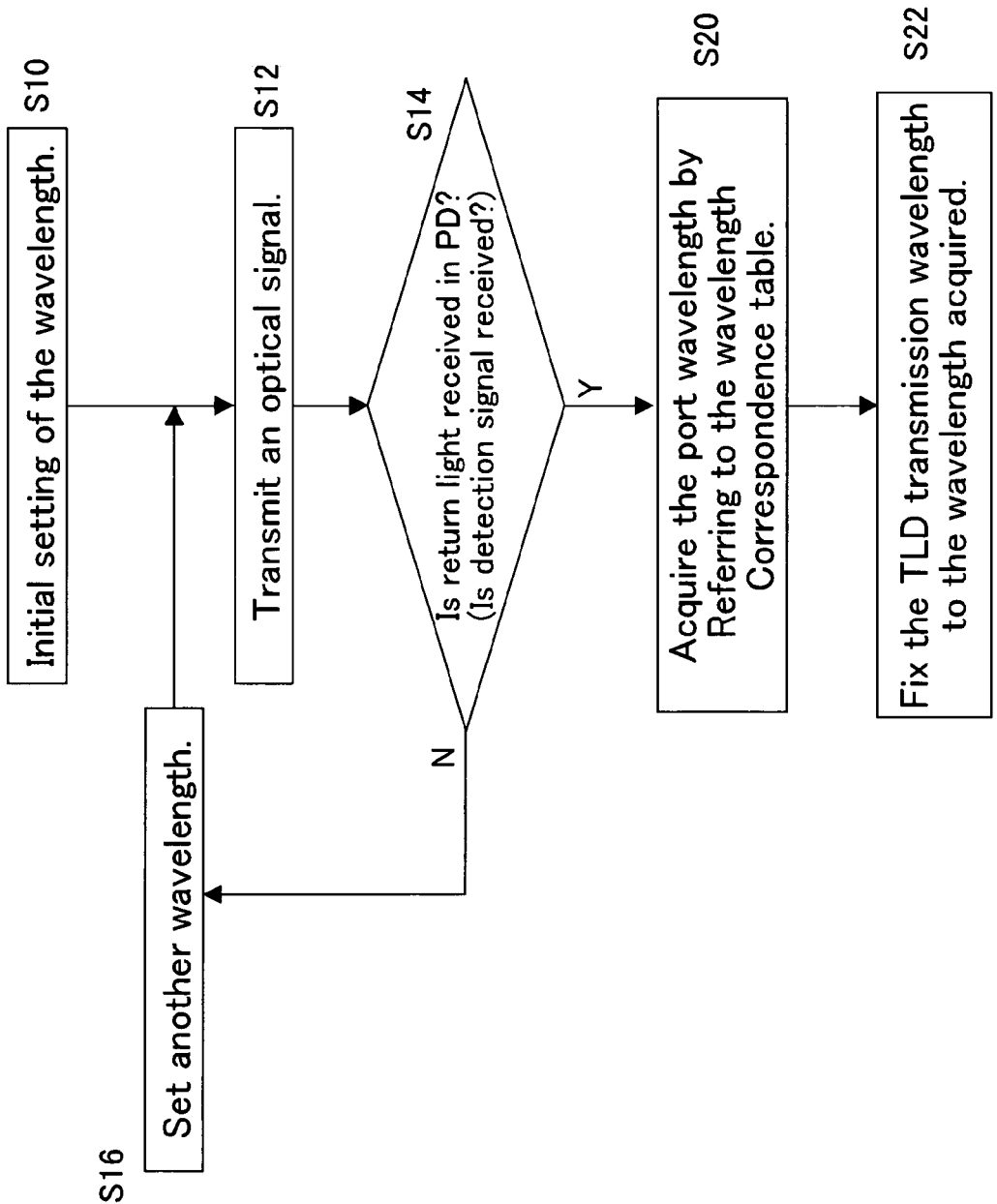
FIG. 8 shows a flowchart illustrating the operation of a wavelength controller 128 in the third exemplary configuration.

FIG. 8 shows a flowchart illustrating the operation of a wavelength controller 128 in the third exemplary configuration. Wavelength controller 128 sets the wavelength in TLD 122 to an arbitrary initial value (S10), and transmits an optical signal having the wavelength set above (S12). Next, in the step S14, when no output signal according to the return light corresponding to the optical signal of the set wavelength is received from photodiode (PD) 126, wavelength controller 128 sets the wavelength of TLD 122 to a different wavelength (S16), and then retransmits the optical signal with the set different wavelength (S12). Wavelength controller 128 repeats the above-mentioned operation until any output signal is received from photodiode (PD) 126. On receipt of the output signal from photodiode (PD) 126, wavelength controller 128 refers to the table exemplified in FIG. 7, acquires the port wavelength corresponding to the transmission wavelength (S20), and fixes the transmission wavelength of TLD 122 to the wavelength acquired above (S22).

Here, when the transmission wavelengths are set for a plurality of optical transmitters at a time, there is a case that the wavelength setting of the optical transmitters cannot be set only by the return light detection. The reason for this is as follows: A particular return light proceeds through multiplexer unit 22 in the reverse direction, and is made to branch into the port wavelength of each port, and then reaches the entire optical transmitters 12. Therefore, when setting the transmission wavelengths for the plurality of optical transmitters at a time, it is not possible to identify from which optical transmitter the optical signal returns. To solve this problem, in order to enable identifying a transmission source of an optical signal corresponding to return light, as an example, optical signals to be output from optical transmitters 12 are intensity-modulated with predetermined frequencies ω, which are differently assigned on a signal-by-signal basis.

Figure 9:
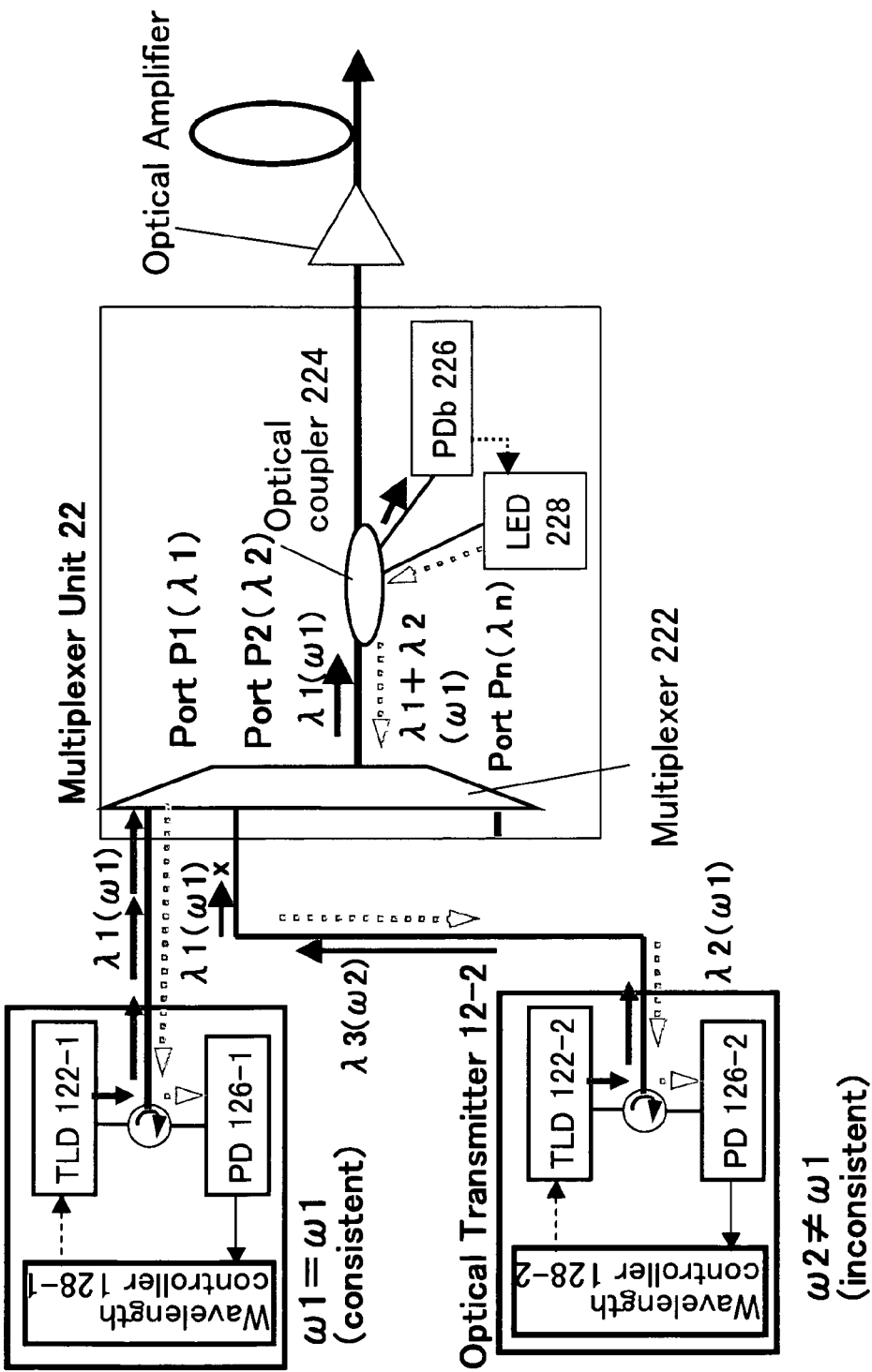
FIG. 9 shows a diagram illustrating a wavelength setting method when the transmission wavelengths are set simultaneously for a plurality of optical transmitters.

FIG. 9 shows a diagram illustrating a wavelength setting method when the transmission wavelengths are set for the plurality of optical transmitters at a time. By way of example, the wavelength division multiplexing optical transmission system shown in FIG. 9 is constituted of the aforementioned first exemplary configuration (FIG. 3), and a case that optical signals are transmitted simultaneously from an optical transmitter 12-1 and an optical transmitter 12-2 is considered. The transmission wavelength (λ1) of the optical signal from optical transmitter 12-1 is consistent with the port wavelength (λ1), and this optical signal is intensity-modulated with a frequency ω1. Also, the transmission wavelength (λ3) of the optical signal from optical transmitter 12-2 is not consistent with the port wavelength (λ2), and this optical signal is intensity-modulated with a frequency ω2. Further, each frequency ω1, ω2 is set corresponding to each signal wavelength.

In this case, since the wavelength λ3 of the optical signal output from optical transmitter 12-2 is not consistent with the port wavelength λ2, the optical signal cannot pass through multiplexer 222 of multiplexer unit 22, and also the return light is not detected. Meanwhile, the wavelength λ1 of the optical signal output from optical transmitter 12-1 is consistent with the port wavelength λ1. Therefore, the optical signal can pass through multiplexer 222 of multiplexer unit 22, and is received by photodiode (PDb) 226. At this time, since the optical signal is superposed and modulated with a frequency ω1, the detection current of photodiode (PDb) 226 having the frequency ω1 is output. Because light emitting diode (LED) 228 also emits light with the frequency ω1 of the detection current, the frequency ω1 is also superposed in the return light.

The return light intensity-modulated with this frequency ω1 proceeds through multiplexer 222 in the reverse direction. Then, the return light is made to branch into the port frequency of each port, and input to each optical transmitter including optical transmitters 12-1, 12-2, and then detected by each photodiode (PD) 126-1, 126-2. Each wavelength controller 128-1, 128-2 in each optical transmitter 12-1, 12-2 compares the frequency of the detection current supplied from each photodiode (PD) 126-1, 126-2 with the frequency superposed onto the optical signal transmitted from TLD 122-1, 122-2 using the synchronous detection. As a result of the comparison, when the frequencies match each other, each wavelength controller 128-1, 128-2 can recognize that the return light is based on the optical signal having been transmitted from the optical transmitter of interest. In the example shown in FIG. 9, wavelength controller 128-2 in optical transmitter 12-2 compares the frequency ω1 of the detection current from photodiode (PD) 126-2 with the frequency ω2 of the optical signal transmitted from TLD 122-2, and determines these two frequencies do not match in this case. As a result, wavelength controller 128-2 recognizes that this return light does not correspond to the optical signal transmitted from optical transmitter 12-2. Namely, wavelength controller 128-2 determines that the transmission wavelength does not match the port wavelength. Meanwhile, wavelength controller 128-1 compares the frequency ω1 of the detection current from photodiode (PD) 126-1 with the frequency ω1 of the optical signal transmitted from TLD 122-1. In this case, since these frequencies match each other, wavelength controller 128-1 recognizes that this return light corresponds to the optical signal transmitted from optical transmitter 12-1 concerned, and determines that the transmission wavelength matches the port wavelength. As a result, wavelength controller 128-1 sets the transmission wavelength of TLD 122-1 to the wavelength λ1.

Figure 10:
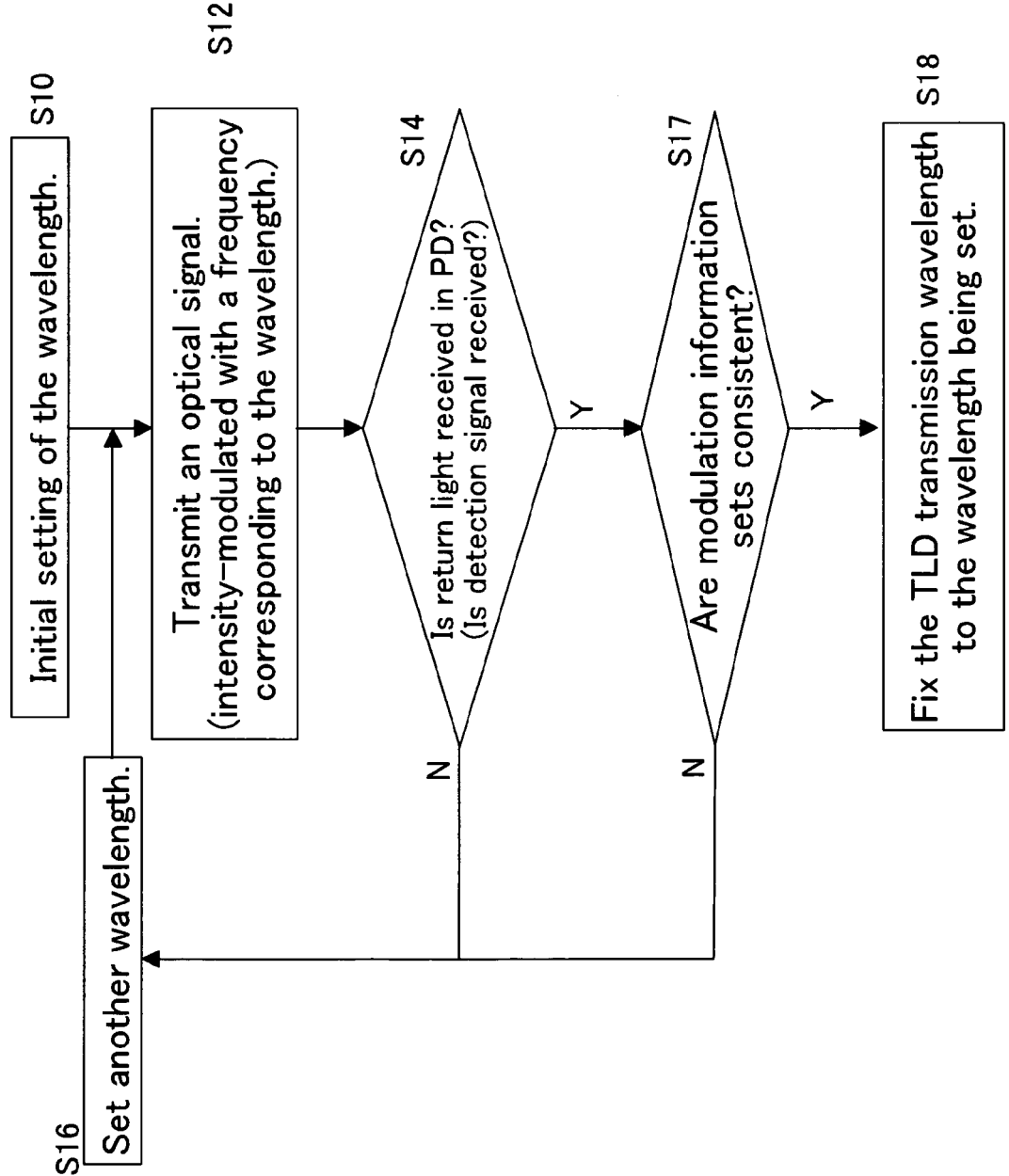
FIG. 10 shows an operation flowchart of a wavelength controller in case of setting the transmission wavelength of an optical transmitter using an intensity-modulated optical signal.

FIG. 10 shows an operation flowchart of the wavelength controller in case of setting the transmission wavelength of an optical transmitter using an intensity-modulated optical signal. As mentioned earlier, wavelength controller 128 sets the wavelength in TLD 122 to an arbitrary initial value (S10), superposes a modulation signal corresponding to the wavelength, and then retransmits the optical signal having the wavelength set above (S12). Next, in the step S14, when no detection signal based on the return light corresponding to the optical signal of the set wavelength is received from photodiode (PD) 126 within a predetermined time period, wavelength controller 128 sets the wavelength of TLD 122 to a different wavelength (S16) superposes a modulation signal corresponding to the different wavelength set above, and then retransmits an optical signal with the set different wavelength (S12). Wavelength controller 128 repeats the above-mentioned operation until a detection signal is received from photodiode (PD) 126. On receipt of the detection signal from photodiode (PD) 126 (S17), wavelength controller 128 checks whether the detection signal frequency matches the frequency superposed onto the optical signal transmitted from TLD 122 using the synchronous detection. If the frequencies match, wavelength controller 128 sets the transmission wavelength of TLD 122 to the frequency being set at present, in the case of the first and second exemplary configurations (S18). Meanwhile, in the case of the third exemplary configuration, wavelength controller 128 refers to the table exemplified in FIG. 7, and acquires a port wavelength corresponding to the transmission wavelength (S20), and fixes the transmission wavelength of TLD 122 to the frequency acquired above (S22).

In the above description, the method of the present invention is not limited to the system using the intensity modulation of the carrier wave (optical transmission signal) being intensity-modulated by a predetermined frequency. For example, a digital signal corresponding to the wavelength may be superposed as information. In such a case, this signal is used for the comparison and the determination of consistency or inconsistency.

Figure 11:
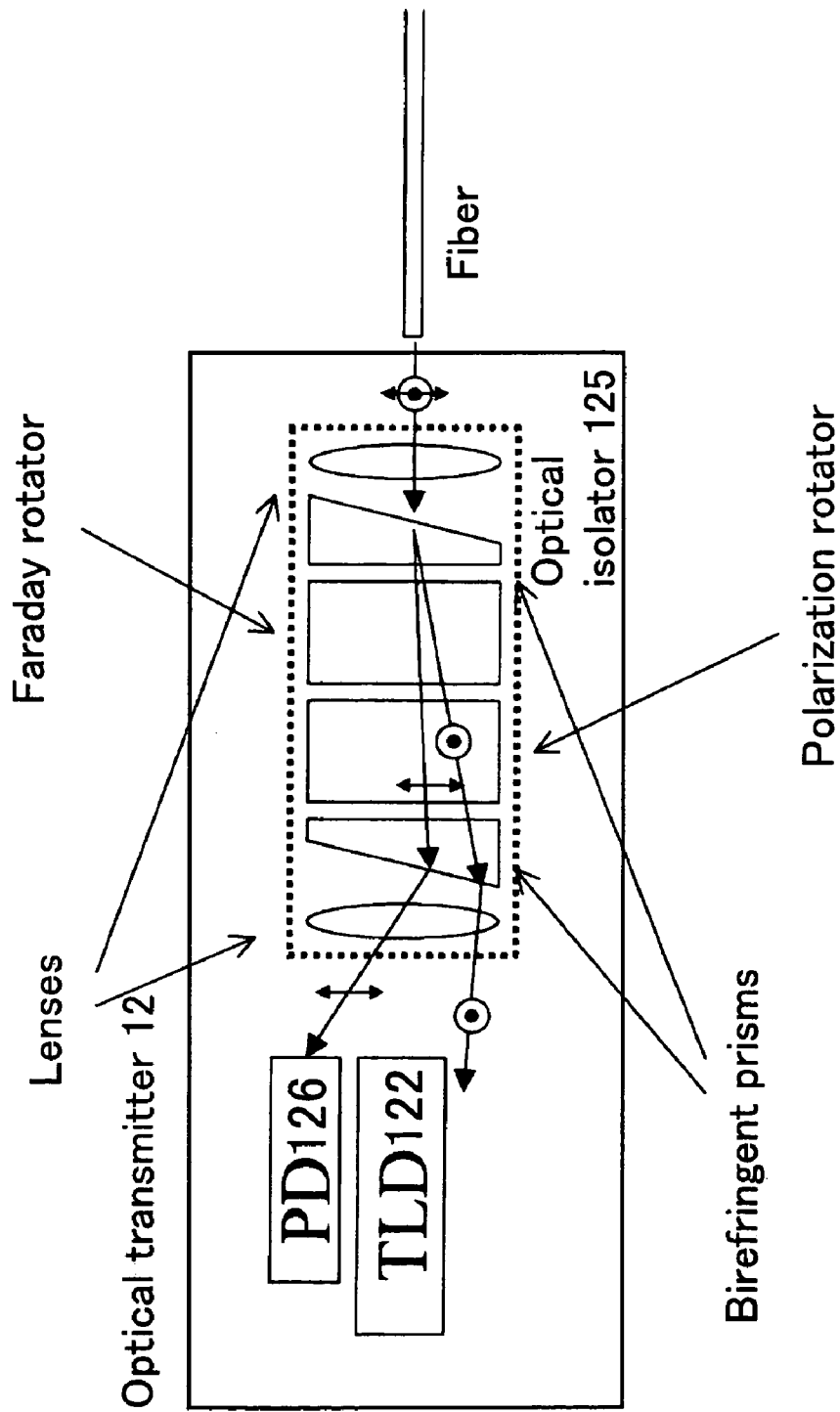
FIG. 11 shows another exemplary configuration of an optical transmitter according to an embodiment of the present invention.

FIG. 11 shows another exemplary configuration of the optical transmitter according to an embodiment of the present invention. In this configuration, optical circulator 124 is not employed in optical transmitter 12 to make transmission light and return light branch. Instead, an optical isolator 125 is employed for branching. Optical isolator 125 (which is shown as being enclosed by the dotted line) is structured of an ordinary optical isolator, in which a Faraday rotator and a polarization rotator are sandwiched by birefringent prisms, and lenses are disposed on the outer sides of the birefringent prisms. An optical signal being input in the normal direction from TLD 122 disposed on the light axis is separated into two polarization components by the birefringent prisms, although not shown in FIG. 11. By making the two polarization components pass through the polarization rotator and the Faraday rotator, and incident to the birefringent prisms, each polarization component can focus on the core portion of the optical fiber disposed on the optical axis. Thus the optical signal can pass through optical isolator 125 in the normal direction, and can proceed in the optical fiber further.

On the other hand, the return light is input into optical isolator 125 in the reverse direction from the optical fiber side. The path of the polarized wave component of the return light in this case is shown in FIG. 11. Namely, after separated into two polarization components by the birefringent prism, the return light is made to pass through the polarization rotator and the Faraday rotator. In the reverse direction, since the polarization plane is different from that in the normal direction by 90 degrees, when the polarization component is input to the birefringent prism, both polarization components do not focus to one point even after collected by the lens, in a different way from the case of the normal direction. The two polarization components are output from the points deviating from the optical axis. Accordingly, the return light can be received by photodiode (PD) 126 disposed on either one of the output points deviating from the optical axis.

In the wavelength division multiplexing optical transmission system according to the embodiments of the present invention, the optical transmitter may be provided with a display unit for displaying the transmission wavelength set in the above manner. According to the embodiments of the present invention, the optical transmitter automatically fixes the transmission wavelength according to the correspondence relation between the transmission wavelength successively set and the port wavelength. In other words, without externally displaying the transmission wavelength value, a worker on site cannot recognize the transmission wavelength having automatically been set. For this reason, it is of use to provide the display unit on the optical transmitter so as to enable the worker to confirm that the transmission wavelength having been set is a particular predetermined wavelength.

Additionally, in a wavelength division multiplexing optical transmission system already put into service, in such a case as installing an additional optical transmitter for expansion, it is preferable that the transmission level of the optical signals for setting the transmission wavelength according to the present invention be set lower than the transmission level of the optical signals used in the normal operation.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A wavelength division multiplexing optical transmission system comprising:
   a plurality of wavelength-variable optical transmitters outputting a plurality of optical transmission signals, respectively, each wavelength-variable optical transmitter having a wavelength-variable light source producing the optical transmission signal output by the respective wavelength-variable optical transmitter;
   a multiplexer multiplexing the plurality of optical transmission signals and thereby outputting multiplexed optical transmission signals; and
   a return optical signal generator generating a respective return optical signal corresponding to each optical transmission signal from the multiplexed optical transmission signals output by the multiplexer, and transmitting each respective return optical signal to the respective wavelength-variable optical transmitter that output the respective optical transmission signal to which the respective return signal corresponds, via said multiplexer, and
   a plurality of ports corresponding respectively to the plurality of wavelength-variable optical transmitters, wherein
   each wavelength-variable optical transmitter transmits the optical transmission signal output from the respective wavelength-variable optical transmitter through the corresponding port to the multiplexer, and
   each return optical signal is transmitted from the multiplexer through the port corresponding to the respective wavelength-variable optical transmitter that output the respective optical transmission signal to which the respective return signal corresponds, to the respective wavelength-variable optical transmitter, so that each return optical signal is thereby transmitted through the same port as the optical transmission signal that corresponds to the respective return optical signal, and
   wherein said each wavelength-variable optical transmitter comprises:
   a first sensor sensing the return optical signal transmitted to the respective wavelength-variable optical transmitter; and
   a controller controlling a transmission wavelength of the optical transmission signal produced by the light source of the respective wavelength-variable optical transmitter based on the return optical signal sensed by the first sensor, when the transmission wavelength of the optical transmission signal produced by the light source is set so as to match a port wavelength proper to the input port to which the optical transmission signal output by the respective wavelength-variable optical transmitter is transmitted to thereby enable wavelength multiplexing by the multiplexer.

2. The wavelength division multiplexing optical transmission system according to claim 1, wherein, for a respective wavelength-variable optical transmitter, when the first sensor does not sense the return optical signal transmitted to the respective wavelength-variable optical transmitter, the controller controls to retransmit the optical transmission signal output by the respective wavelength-variable optical transmitter after changing a transmission wavelength of the optical transmission signal to another wavelength, and when the first sensor senses the return optical signal, the controller sets the transmission wavelength to an optical transmission signal wavelength corresponding to said sensed return optical signal.

3. The wavelength division multiplexing optical transmission system according to claim 2, further comprising a display unit displaying the transmission wavelength set by the controller.

4. The wavelength division multiplexing optical transmission system according to claim 1, wherein the return optical signal generator comprises a reflector reflecting the optical transmission signals.

5. A control method for use with a wavelength division multiplexing optical transmission system including a plurality of wavelength-variable optical transmitters outputting a plurality of wavelength-variable optical transmission signals, respectively, a plurality of ports corresponding respectively to the plurality of wavelength-variable optical transmitters, and a multiplexer multiplexing the plurality of optical transmission signals and thereby outputting the multiplexed optical transmission signals, said control method comprising:

generating a respective return optical signal corresponding to each optical transmission signal from the multiplexed optical transmission signals output by the multiplexer, and transmitting each respective return optical signal to the respective wavelength-variable optical transmitter that output the respective optical transmission signal to which the respective return signal corresponds, via the multiplexer, wherein each wavelength-variable optical transmitter transmits the optical transmission signal output from the respective wavelength-variable optical transmitter through the corresponding port to the multiplexer, and each return optical signal is transmitted from the multiplexer through the port corresponding to the respective wavelength-variable optical transmitter that output the respective optical transmission signal to which the respective return signal corresponds, to the respective wavelength-variable optical transmitter to thereby be detected by the respective wavelength-variable optical transmitter, so that each return optical signal is thereby transmitted through the same port as the optical transmission signal that corresponds to the respective return optical signal; and for each respective wavelength-variable optical transmitter, controlling a transmission wavelength of the optical transmission signal output by the respective wavelength-variable optical transmitter based on the return optical signal detected by the respective wavelength-variable optical transmitter, when the transmission wavelength of the optical transmission signal is set so as to match a port wavelength proper to the respective port corresponding to the respective wavelength-variable optical transmitter, to thereby enable wavelength multiplexing.

6. The control method according to claim 5, wherein, in the controlling, for each wavelength-variable optical transmitter, when the respective wavelength-variable optical transmitter does not detect the return optical signal, retransmitting the optical transmission signal after changing the transmission wavelength of the optical transmission signal, and when the respective wavelength-variable optical transmitter detects the return optical signal, setting the transmission wavelength to the optical transmission signal wavelength corresponding to the detected return optical signal.

7. An apparatus comprising:

a plurality of wavelength-variable optical transmitters outputting a plurality of optical transmission signals, respectively;

a plurality of ports corresponding, respectively, to the plurality of wavelength-variable optical transmitters, wherein the optical transmission signal output by each respective wavelength-variable optical transmitter is transmitted through the port corresponding to the respective wavelength-variable optical transmitter so that the plurality of optical transmission signals are thereby transmitted through the plurality of ports, respectively;

a multiplexer multiplexing the plurality of optical transmission signals having been transmitted through the plurality of ports into a multiplexed light; and a return optical signal generator generating a return signal indicating signal levels of the plurality of optical transmission signals from the multiplexed light, wherein the generated returned signal is transmitted to the multiplexer, and then branched by the multiplexer into a plurality of individual signals corresponding, respectively, to the plurality of wavelength-variable optical transmitters, each individual signal indicating the signal level of the optical transmission signal output by the corresponding wavelength-variable optical transmitter, and each individual signal is transmitted to the corresponding wavelength-variable optical transmitter by being transmitted through the port corresponding to said corresponding wavelength-variable optical transmitter, so that each individual signal is thereby transmitted through the same port as the optical transmission signal output by the wavelength-variable optical transmitter to which the respective individual signal corresponds.

8. A wavelength division multiplexing optical transmission system comprising:

a plurality of wavelength-variable optical transmitters each having a wavelength-variable light source;

a multiplexer multiplexing a plurality of optical transmission signals having different wavelengths respectively input from said plurality of wavelength-variable optical transmitters, and outputting the multiplexed optical transmission signal; and a return optical signal generator generating a return optical signal corresponding to each optical transmission signal output from said multiplexer, and transmitting said return optical signal toward the wavelength-variable optical transmitters via said multiplexer, wherein said each wavelength-variable optical transmitter comprises:
  a first sensor sensing the return optical signal; and
  a controller controlling a transmission wavelength of the optical transmission signal output from the light source based on the return optical signal detected in the first sensor corresponding to the optical transmission signal, when the transmission wavelength of the optical transmission signal output from the light source is set so as to match a port wavelength proper to each multiplexer input port receiving said optical transmission signal to enable wavelength multiplexing, wherein the return optical signal generator comprises:
  a second sensor sensing the optical transmission signals; and
  a generator generating the return optical signal based on a sense signal from said second sensor.

* * * * *

UNITED STATES PATENT AND TRADEMARK OFFICE
CERTIFICATE OF CORRECTION

PATENT NO. : 7,596,315 B2  Page 1 of 1
APPLICATION NO. : 10/914313
DATED : September 29, 2009
INVENTOR(S) : Nakashima et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1153 days.

Signed and Sealed this

Fourteenth Day of December, 2010

David J. Kappos
*Director of the United States Patent and Trademark Office*